Figure 1:
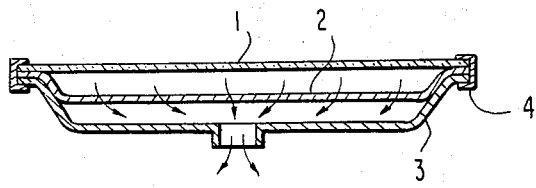

United States Patent [19]

Sundquist

[11] Patent Number: 4,538,592
[45] Date of Patent: Sep. 3, 1985

[54] SOLAR COLLECTOR

[76] Inventor: Carl R. Sundquist, Slättarödsvägen 4426, S-260 93 Torekov, Sweden

[21] Appl. No.: 581,192

[22] PCT Filed: May 26, 1983

[86] PCT No.: PCT/SE83/00210
§ 371 Date: Jan. 27, 1984
§ 102(e) Date: Jan. 27, 1984

[87] PCT Pub. No.: WO83/04299
PCT Pub. Date: Dec. 8, 1983

[30] Foreign Application Priority Data

May 27, 1982 [SE] Sweden ................................ 820381

[51] Int. Cl.³ .............................................. F24J 3/02
[52] U.S. Cl. .................................... 126/450; 126/417
[58] Field of Search ................................ 126/450, 417

[56] References Cited

U.S. PATENT DOCUMENTS

| | | | |
|---|---|---|---|
| 3,076,450 | 2/1963 | Gough et al. | 126/450 X |
| 4,167,935 | 9/1979 | Severson | 126/450 |
| 4,245,619 | 1/1981 | Ogilvie | 126/444 X |
| 4,271,825 | 6/1981 | Schwob et al. | 126/450 |
| 4,278,074 | 7/1981 | Uroshevich | 126/450 X |
| 4,305,384 | 12/1981 | Prøven | 126/450 |

Primary Examiner—Larry Jones
Attorney, Agent, or Firm—Sughrue, Mion, Zinn, Macpeak, and Seas

[57] ABSTRACT

A solar collector with a supporting panel made of fibrous material, the material being thicker on the bottom of the panel where greater insulation is required, and denser and thinner on the sides where greater strength is required. This design permits a thinner absorber panel to be used, resulting in decreased cost of materials and manufacture and enhanced performance and greater ease of construction.

5 Claims, 12 Drawing Figures

SOLAR COLLECTOR

The present invention relates to a solar collector comprising a supporting panel, a transparent plate cover connected at its rim portion to said supporting panel, and an absorber element enclosed between said supporting panel and said plate cover, said supporting panel being compression molded of a fiber material with a thermosetting binding agent and having a generally plain bottom portion and a rim portion extending at an angle to said bottom portion and made integral therewith.

Solar collectors of a plurality of types are previously known in which the heat conveying medium is usually water to which a freezing protective agent is often added. Other media which are utilized are air, oil, freon, etc.

When the heat conveying medium is a liquid it usually flows in a channel system within the absorber panel, and in other cases the flow takes place in tubes provided with flanges. The channel system for the liquid is usually made of metal or plastic. When gas is used as the heat conveying medium it generally flows above or below the absorber panel, and in certain cases on both sides thereof. In some known cases the flow takes place through openings, slots or the like in the absorber panel. In other cases the throughflow of air takes place through diagonally arranged metal or glass sheets constituting the absorber. In another case the absorber is a black-coloured net or sparse sheet of cloth stretched in a framework in which the heat conveying medium flows through the absorber.

A characterizing feature of most of the absorber embodiments in which heat is transferred to a gaseous medium is that the absorber member has a heat exchanging area exposed to the media which is often equal to that of the glass sheet cover or up to 4 to 5 times this area. In solar panels in which the heat conveying medium is a gas, the biggest problem is to provide a design in which the required heat transmission is obtained at a very minor over-temperature of the absorbent material. If this can be achieved it is likely that high efficiency will be obtained.

Irrespective of the heat conveying medium, most solar collectors are as a rule made of a sheet metal box structure, often having an aluminium frame as a stabilizing portion, and in other designs a channel-shaped construction glass is used which is bonded to a sheet metal box structure. An insulation material is then generally inserted into this box structure to reduce heat losses from the solar collector.

A general feature of these designs is that they comprise a plurality of points in which the heat transmission to the ambient atmosphere is great because of so-called "cold leaks". Another feature of the designs is the great demand of labour and machinery in the production which reduces the production capacity and results in high production costs. The distribution of cost in solar collectors produced at present is such that the cost is about 25% for the absorber, about 15% for the protective glass cover and about 60% for the supporting panel and insulation as calculated per m² of the total costs of the solar collector. This is irrespective of whether the heat conveying medium is a gas or a liquid.

The costs per unit of area of the solar collectors produced at present is high. The object of the present invention is to provide a solar collector in which the cost of material and labour required for the production thereof can be substantially reduced as compared to solar collectors used at present. This object has been achieved by a solar collector of the kind mentioned in the introduction which according to the invention is generally characterized in that the degree of compression of the material of the supporting panel varies at different portions thereof with regard to the requirements of strength and thermal insulation, whereby the material is compressed to a lesser degree and has a greater thickness at portions in which the requirement of thermal insulation is high, and is compressed to a greater degree and has a lesser thickness at portions in which the requirement of strength is high.

Figure 2:
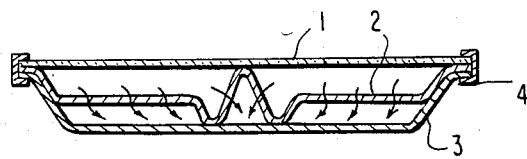
Figure 3:
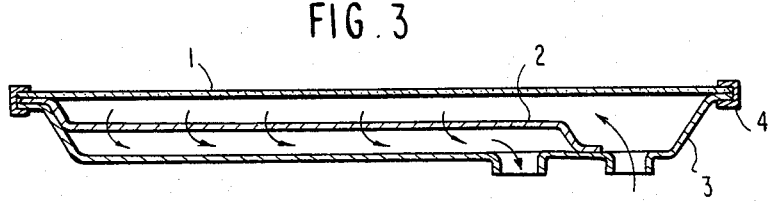
Figure 4:
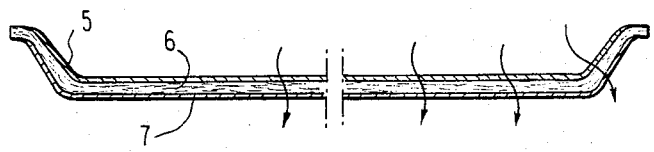
Figure 5:
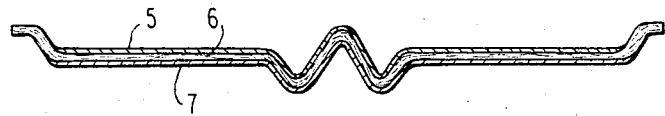
Figure 6:
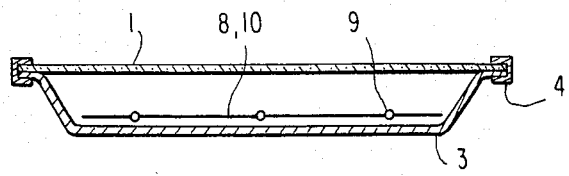
Figure 7:
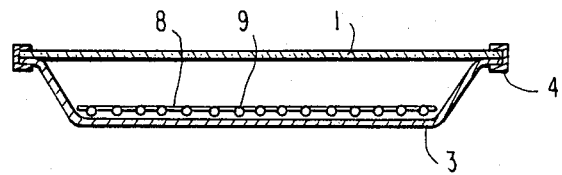
Figure 8:
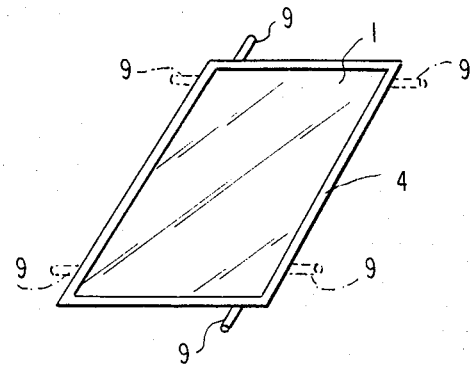
Figure 9:
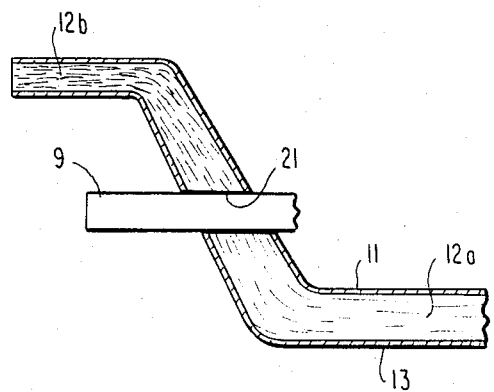
Figure 10:
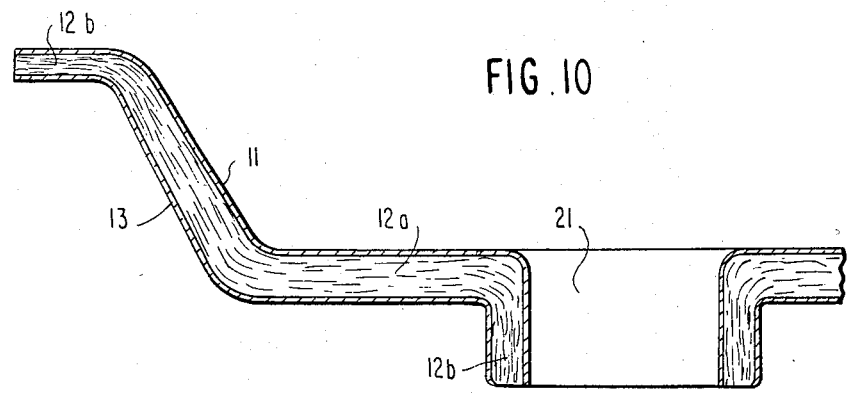

The invention will be described in more detail below with reference to the accompanying drawings, in which:

FIGS. 1 to 3 diagrammatically illustrate different embodiments of a solar collector in which gas is used as heating medium, FIGS. 4 and 5 illustrate absorber parts of gas medium solar collectors, FIGS. 6 to 8 illustrate different embodiments having a liquid heating medium, FIGS. 9 and 10 illustrate different embodiments of the supporting panel.

Figure 11:
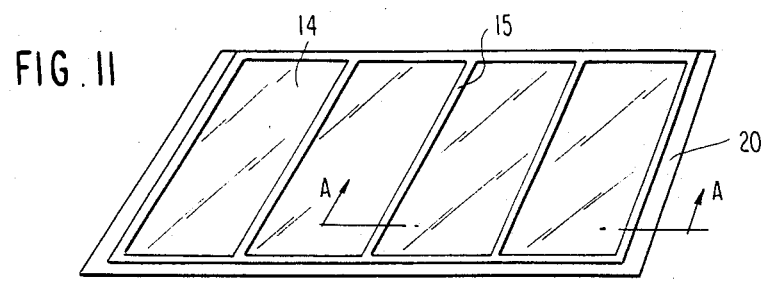
Figure 11A:
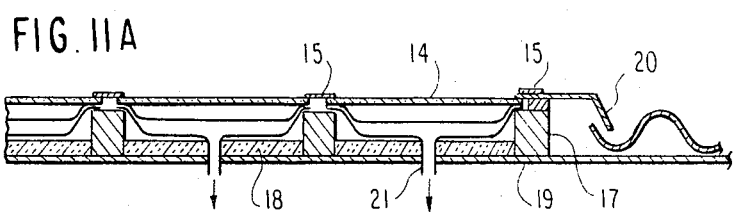
Figure 12:
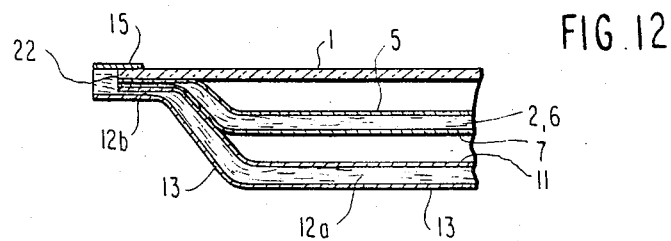

FIG. 11 illustrates a perspective view and a cross-section along line A thereof of an installation in which the same or similar parts of the various embodiments have the same reference numerals, and FIG. 12 illustrates a cross-sectional view of a portion of the solar collector according to the invention.

The solar collector shown in cross-section in FIGS. 1 to 3 comprises a glass cover 1, an absorber 2, a supporting panel 3, and a rim clamping means 4.

FIGS. 4 and 5 are cross-sectional views of absorber elements for a gaseous heating medium, comprising an absorbing and heat exchanging layer 5, flow distributing material 6, and a connecting bottom layer 7.

The embodiments shown in FIGS. 6–8 for a liquid heat conveying medium comprise an absorber layer 8, a liquid passage 9, and a heat transmitting flange 10. Alternative arrangements are shown in dashed lines.

FIGS. 9 and 10 illustrate different embodiments of the supporting panel. The embodiment of FIG. 9 is for a liquid medium, and that of FIG. 10 is for a gas. The shown embodiments comprise a fiber retaining layer 11, an insulating basic fibre material of low density 12a, and high density 12b, a weather protective surface layer 13, and connection openings 21 for heating media. The gas medium arrangement shown in FIG. 11 comprises solar collectors 14, edge strips 15, framework 17, additional insulation 18, bottom cover 19, connection fitting 20 for outer roof, and connection openings 21 for heating media.

According to the invention, the supporting panel 3 of the solar collector is made of a fiber material, such as pulled rags, synthetic, mineral or natural fibres, e.g. coco fibres, which together with a binding agent can be compression moulded at high temperature and pressure to obtain areas of high density 12b and at the same time areas having a low density 12a. In this way it is possible to obtain a supporting panel having hard and strong edges and supporting points, for connection openings, etc, and at the same time bottom and side walls having a lower density and consequently better insulation properties. On its inside the supporting panel has a very thin retaining layer 11 of e.g. synthetic fibre having a high temperature resistance to prevent fibres from being released and forming dust within the collector. On its outer surface the supporting panel has a protective layer 13 serving as a protection against the atmosphere and also against mechanical damage. This layer can be a thin sheet of metal or PVC or other resin material applied in connection with the compression moulding. The connection openings 21 for the heating medium are also formed during this stage.

In the case of a gaseous heat conveying medium, the absorber element 2 of the solar collector is made of a similar material. The element 2 preferably comprises an absorbing layer 5 made of a very fine-textured material, such as glassfibres of black glass, black synthetic fibres, or black fine-textured aluminum felt covered with a selective absorbent paint. Such material has a very large heat transfer area when air is conveyed through the layer. In order to obtain this function it is required that the air current be evenly distributed over the entire area, and that the construction is so stable that no sinking or setting thereof can take place. This is obtained by making the body of the absorber element of a fibre material of the same type as that of the supporting panel described above. This material has a flow equalizing effect, since the pressure drop of the gas is about 10 times as high across the material as it is in the passages formed above and below the absorber element 2. In spite thereof, the pressure drop of the entire assembly can be kept as low as about 5 to 15 Pa. On the lower face of the absorber element a very thin heat resistant web 7 is applied in order to prevent the release of fibres and to produce a certain "sandwich effect".

An absorber element 2 of the kind described above has the following advantageous properties:

low weight; about 0,5–0,7 kg/m$^2$, low overtemperature as compared to the output temperature low heat capacity, whereby the solar collector reacts rapidly to variations of the incoming solar radiation.

According to the invention, the supporting panel 3 can be used in connection with most of the various heat conveying media, such as air, water, oil, freon, etc.

FIGS. 6 to 8 illustrate examples of various types of absorber elements used in the solar collector. In all the cases shown, the amount of heat stored in the body of the solar collector is kept low due to the fact that the specific heat content of the material is low and that the total weight is low, and that the supporting panel has no "cold leaks".

The glass cover 1 can be made of ordinary glass or tempered glass, single or double. Various types of single or double synthetic glass can also be used, since the supporting panel is relatively elastic and can follow the movements of the glass without incurring tension.

The solar collector according to the invention is to be regarded as a construction element of a complete solar heating plant, and the amount of extra insulation 18 required for various applications is determined with regard to the operating temperature of the system. In case of high temperatures this layer should be about 100–150 mm, in the case of domestic hot water production the layer may be 0–50 mm. If the solar collector is used in a pool heating system no extra insulation is required, and neither in the case of heating ventilation air. The dimensions of the supporting frame-work 17 should be selected accordingly. The strip 15 and fitting 20 are also attached to the frame work 17.

The solar collector according to the invention is characterized by a low weight, about 7–12 kg/m$^2$ and can therefore be produced as large modules without technical problems. The supporting panel 3 is made as an integral, trough-shaped element to which the glass cover 1 is attached by the rim clamping means 4 extending around the periphery of the element. A sealing compound or a gasket is applied between the glass cover and the supporting panel. The absorber element 2 is attached to the supporting panel 3 by any suitable means, such as bonding. The supporting panel can also be provided with a circumferential recess 22 in which the glass cover 1 is attached by bonding (FIG. 12).

I claim:

1. A solar collector comprising a supporting panel, a transparent plate cover connected at its rim portion to said supporting panel, and an absorber element enclosed between said supporting panel and said plate cover, said supporting panel being compression molded of a fiber material which a thermosetting binding agent and having a generally plain bottom portion and a rim portion extending at an angle to said bottom portion and made integral therewith, characterized in that the density of the material of the supporting panel varies at different portions thereof in relation to the requirements of strength and thermal insulation such that the material is of a lesser density and has a greater thickness where the requirement of thermal insulation is high and is of a greater density and has a lesser thickness where the requirement of strength is high.

2. Solar collector according to claim 1, characterized in that the fiber material of the supporting panel comprises rags, bamboo, coco, mineral or synthetic fibres.

3. Solar collector according to claims 1 or 2, characterized in that the supporting panel has a moisture-protective sheet cover bonded to the surface thereof.

4. Solar collector according to any of claims 1 to 2, characterized in that the absorber panel is compression molded of a fiber material having a surface layer of heat absorbing material.

5. Solar collector according to claim 3, characterized in that the absorber panel is compression molded of a fiber material having a surface layer of heat absorbing material.

* * * * *